US006871711B2

(12) United States Patent
Hansson

(10) Patent No.: US 6,871,711 B2
(45) Date of Patent: Mar. 29, 2005

(54) PORTABLE POWER TOOL WITH GREASE LUBRICATED ANGLE GEAR DRIVE

(75) Inventor: Gunnar Christer Hansson, Stockholm (SE)

(73) Assignee: Atlas Copco Tools AB, Nacka (SE)

( * ) Notice: Subject to any disclaimer, the term of this patent is extended or adjusted under 35 U.S.C. 154(b) by 276 days.

(21) Appl. No.: 10/439,891

(22) Filed: May 16, 2003

(65) Prior Publication Data

US 2003/0217854 A1 Nov. 27, 2003

(30) Foreign Application Priority Data

May 22, 2002 (SE) .............................................. 0201525

(51) Int. Cl.$^7$ ................................................ F16N 7/04
(52) U.S. Cl. .................... 173/216; 173/213; 173/104; 173/DIG. 3; 184/6.14
(58) Field of Search ................................ 173/213, 216, 173/198, 38, DIG. 3, 199, 218; 184/6.14, 5, 64, 69, 102

(56) References Cited

U.S. PATENT DOCUMENTS

| 4,190,116 A | * | 2/1980 | O'Neal et al. | 173/198 |
| 4,298,073 A | * | 11/1981 | Yates | 173/198 |
| 4,403,679 A | * | 9/1983 | Snider | 173/218 |
| 5,012,878 A | * | 5/1991 | Anderson | 173/213 |
| 5,370,194 A | * | 12/1994 | Anderson | 173/216 |
| 5,690,183 A | * | 11/1997 | Sollami | 173/216 |
| 5,967,243 A | * | 10/1999 | Jacobsson | 173/216 |
| 6,109,366 A | * | 8/2000 | Jansson et al. | 173/216 |

* cited by examiner

Primary Examiner—Scott A. Smith
(74) Attorney, Agent, or Firm—Frishauf, Holtz, Goodman & Chick, P.C.

(57) ABSTRACT

A power tool of the type comprises a housing (10), a rotation motor (11), an output shaft (12) carrying and rotating a working implement, and a grease lubricated angle drive (13) coupling the output shaft (12) to the motor (11), wherein the angle drive (13) includes a gear chamber (30) containing lubricating grease, a pinion (16) connected to the motor (11), and a bevel gear (17) secured to the output shaft (12). An immovable wall element (24) located in a close vicinity to the bevel gear (17) forms a grease screen for preventing a great part of the grease volume in the gear chamber (30) from getting into direct contact with the bevel teeth and being hot agitated. A grease relocating element (33) is movably guided along a circular path formed by a groove (32) in an end wall (31) of the housing (10) beneath the bevel gear (17), and a coupling device (34) is attached to the bevel gear (17) and arranged to engage and move the grease relocating element (33) along the circular path in the housing (10) for relocating grease from an inactive deposition area in the groove (32) to an active lubricating area at rotation of the bevel gear (17).

13 Claims, 4 Drawing Sheets

PORTABLE POWER TOOL WITH GREASE LUBRICATED ANGLE GEAR DRIVE

The invention relates to a portable power tool having a rotation motor, an output shaft for carrying and rotating a working implement, and a grease lubricated pinion/bevel gear angle drive confined in a gear chamber and coupling the output shaft to the motor.

This type of power tool is commonly used as grinding machines, power wrenches, drilling machines etc. where a good accessibility in cramped working areas and/or a good torque reaction control have high priority. A problem concerned with this type of tool relates to a limited service life of the angle drive. This is mainly due to a poor lubrication of the gear teeth of the pinion and the bevel gear forming the angle drive. Several attempts have been made to cure this problem with more or less discouraging results.

Angle drives for the above mentioned applications are lubricated with grease, supplied at the assembly of the angle drive and/or added at certain operation intervals. What always happens during tool operation is that the grease in the angle drive gear chamber is thrown off the gear teeth and is deposited on the walls of the gear chamber. The result is that after a while no grease is left on the gear teeth, i.e. a dry gear teeth engagement. This is detrimental to the service life of the angle drive.

One way of obtaining a satisfactory lubrication is to add a certain amount of grease to the gear chamber at short intervals, either manually via a grease nipple or automatically by a grease dispensing device originally filled with a larger amount of grease. Even a dispensing device has to be refilled at some intervals, though. When the gear chamber eventually after repeated additions has been filled up with grease to a certain extent the angle drive has to be dismantled for emptying and/or replacing the grease. Introducing extra service intervals for the tool just to ensure a good angle drive lubrication is undesirable since it decreases the efficiency of the tool.

Another way of controlling grease application on the angle drive gear teeth is to accomplish relocation of the grease already present in the angle drive gear chamber from areas where the grease tends to deposit toward the gear teeth, continuously or at certain operation intervals.

The main object of the invention is to provide a power tool of the above type having an improved device for a automatic repeated relocation of the grease present in the angle drive gear chamber, thereby accomplishing an improved lubrication of the angle drive gear teeth.

Another object of the invention is to provide a power tool of the above mentioned type with an improved angle drive grease relocation device which is active both at reverse rotation of the output shaft, for instance at change of working implement, and at forward rotation of the output shaft.

Further objects and advantages of the invention will appear from the following specification and claims.

A preferred embodiment of the invention is described below in detail with reference to the accompanying drawings.

Figure 1:
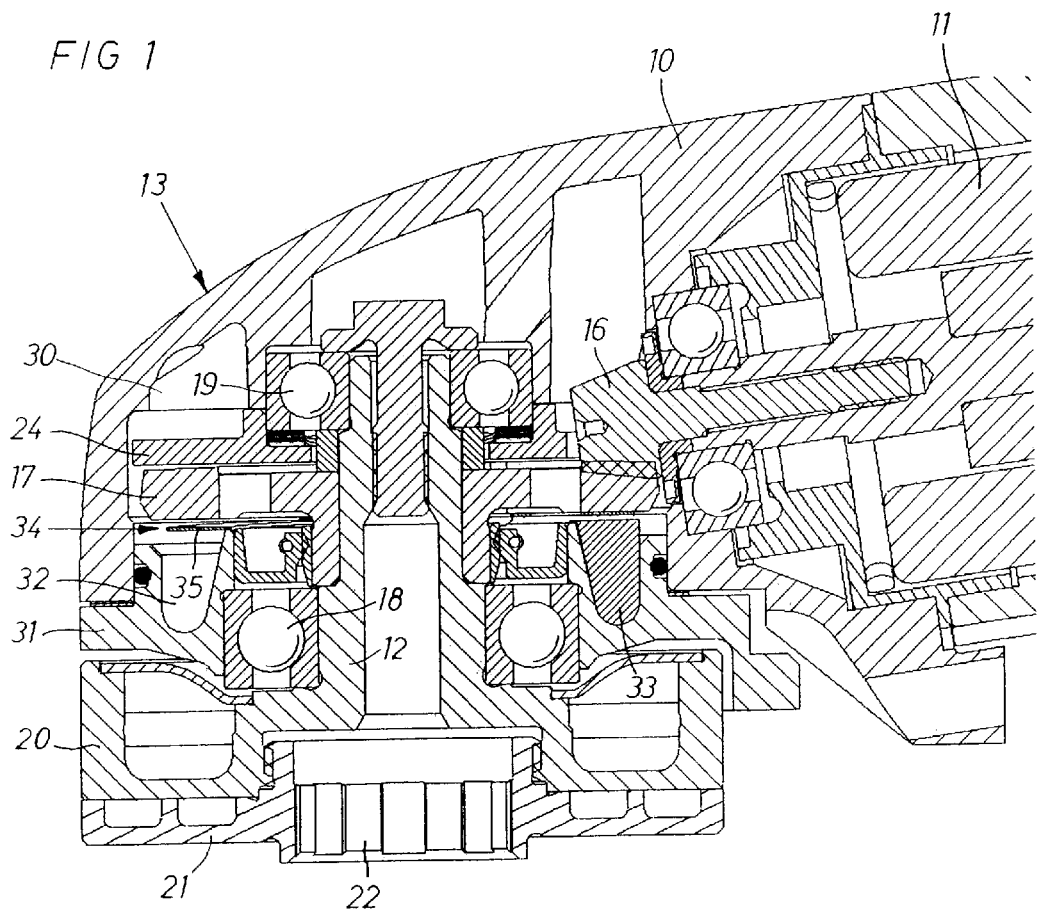
FIG. 1 shows a longitudinal section through the forward end a power tool according to the invention.

The power tool illustrated in the drawings is of the angle drive type and comprises a housing 10, a rotation motor 11, an output shaft 12 arranged in a certain angle relative to the rotation axis of the motor 11, and an angle drive 13 coupling the output shaft 12 to the motor 11. The angle drive 13 comprises a pinion 16 connected to the motor 11 and a bevel gear 17 secured to the output shaft 12. The pinion 16 engages gear teeth on the upside of the bevel gear 17. The output shaft 12 is journalled relative to the housing 10 in two roller bearings 18,19 and carries at its forward end a combined ball-type balancing unit and a mounting device 20 for attaching a working implement (not shown) to the output shaft 12. For supporting and securing the working implement there is also provided a support disc 21 having a central splined opening 22 for receiving a matching clamping piece (not shown) for engaging the working implement.

Figure 4:
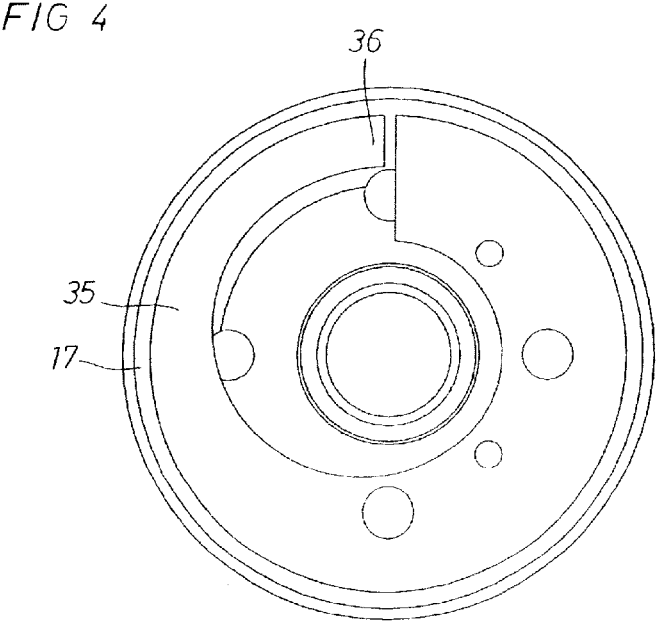
FIG. 4 shows a horizontal view illustrating the underside of the bevel gear and a leaf spring coupling for activating the grease relocating device.

In a close vicinity to the upper end surface of the bevel gear 17 there is mounted a stationary disc shaped wall element 24 forming a grease screen device. This wall element 24 is secured to the housing 10 by two screws 25 and is formed with a central opening 26 for receiving the output shaft 12 and a sleeve 27 with a hexagonal opening for the output shaft 12, and a lateral opening 28 for the pinion 16. See FIG. 4.

Figure 2:
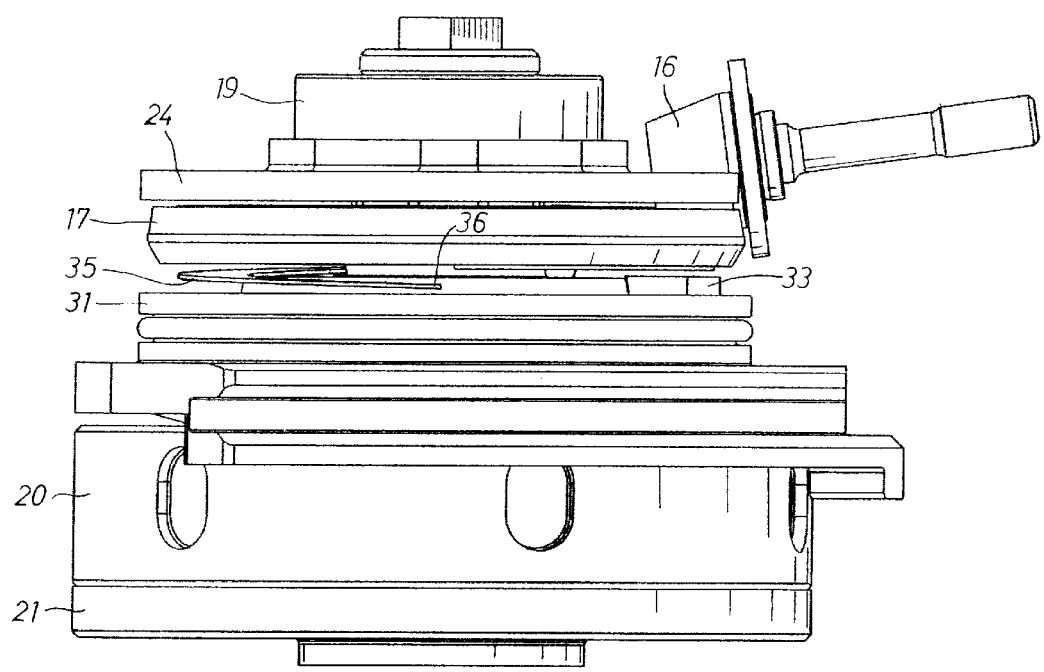
FIG. 2 shows a side view of the angle drive and output shaft.
Figure 3:
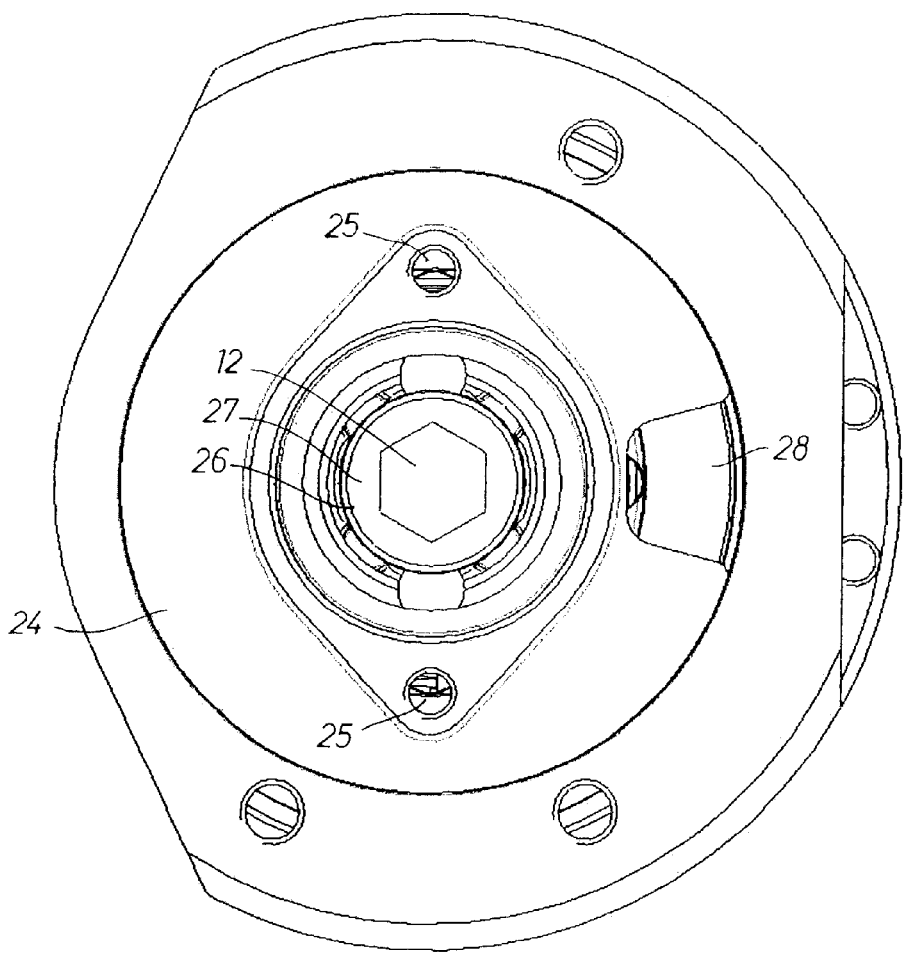
FIG. 3 shows a horizontal view illustrating a grease screen device with a lateral opening for the angle drive pinion.
Figure 5:
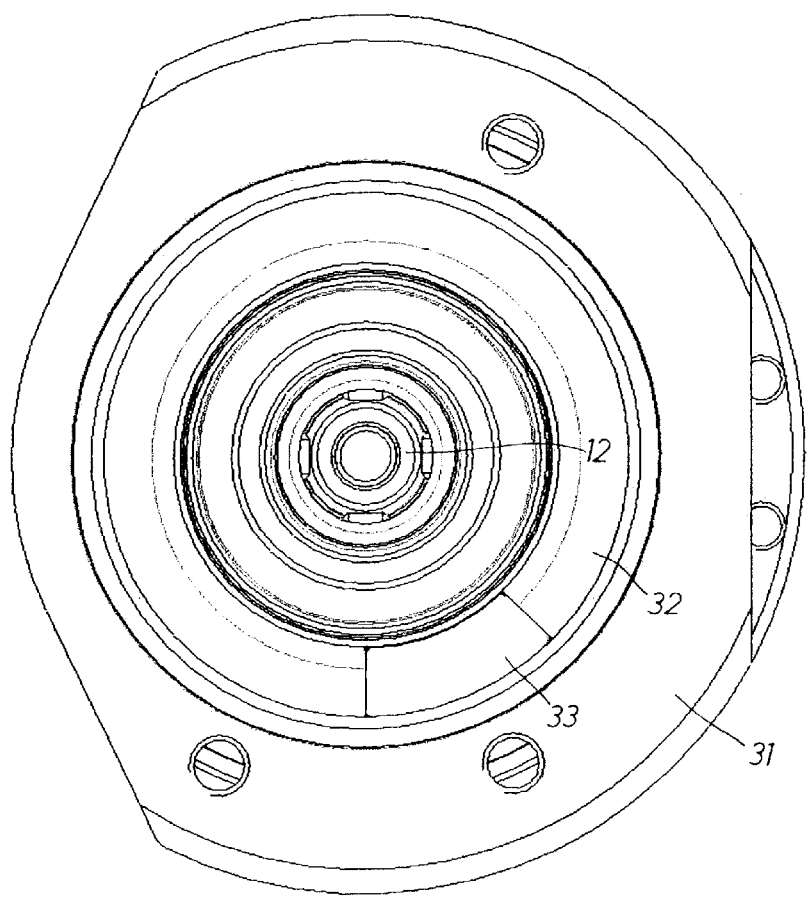
FIG. 5 shows a horizontal view of the forward end wall of the angle drive gear chamber including a grease relocating device.

The angle drive 13 comprises a gear chamber 30 having a forward end wall 31 supporting the forward output shaft bearing 18 and having a circular groove 32 concentrically disposed relative to the output shaft 12. The groove 32 has a rounded V-shape and forms a circular movement path for a grease relocating element 33. A coupling device 34 is mounted on the underside of the bevel gear 13 for activating and moving the grease relocating element 33 along the groove 32 at rotational movement of the output shaft 12 and the bevel gear 17. This coupling device 34 comprises a leaf spring element 35 having a free end portion 36 which is pre-formed to reach axially below the upper edge of the grease relocating element 33 (see FIG. 2) so as to positively engage by its free end portion 36 the grease relocating element 33 and move the latter along the groove 32 at reverse rotation of the output shaft 12. The leaf spring element 35 is secured to the underside of the bevel gear 17. See FIG. 4.

Before use of the power tool, the gear chamber 30 is filled up to a large extent, for instance to 70–90% of its volume, with lubricating grease, and because of the grease screen forming wall element 24 a great part of the grease volume is prevented from getting into contact with the teeth of the bevel gear 17 and is, thereby, prevented from being fed into the engagement zone between the pinion 16 and the bevel gear 17. This means that despite a high degree of grease filling in the gear chamber 30 a small part only of the grease volume will be agitated by the pinion and bevel gear teeth and the temperature of the grease could be maintained at an acceptably low level.

Despite the above described grease screen arrangement a lot of grease will successively end up beneath the bevel gear 17, i.e. at a location where it can not contribute to the lubrication of the angle drive gear teeth. This means that the circular groove 32 in the lower gear chamber end wall 31 is filled with grease. At reverse rotation movements of the output shaft 12, normally occurring at change of working implement, the free end portion 36 of the leaf spring element 35 will engage the grease relocation element 33 and move the latter a certain distance along the groove 33, thereby forcing some grease out of the groove 32 and up along the side walls of the gear chamber 30. This means that some grease is returned from the deposition area underneath the bevel gear 17 to the active gear teeth contact zone.

Also at forward rotation of the output shaft 12 during normal operation of the tool the leaf spring 35 will accomplish some slow movement of the grease relocation element 33, because at forward rotation the leaf spring element 35 sweeps over the grease relocation element 35 yielding axially elastically under a certain contact force and exerts a certain frictional drive force onto the grease relocation element 35. This drive force is transferred via viscous friction in the grease layer inevitably present between the two parts and is repeated at the rotation frequency of the output shaft 12.

In order to enhance the driving force between the leaf spring element 35 and the grease relocation element 33 during normal forward rotation of the output shaft 12 the grease relocation element 33 could at least partly be formed of a magnetic material, whereas the leaf spring element 35 comprises a ferro-magnetic material. Thereby is accomplished a magnetic pulling force on the grease relocation element 35 each time the leaf spring element 35 passes the latter. Since the rotation speed of the output shaft 12 is high there is a high frequency of pulling force pulses, caused by friction or friction/magnetic action, acting on the grease relocation element 35 resulting in a successive advancement of the grease relocation element 35 in the groove 32 and, hence, a successive relocation of grease from underneath the bevel gear 17 to active lubricating areas.

The invention is not limited to the above described example but may be varied within the scope of the invention as recited in the claims.

What is claimed is:

1. Power tool, comprising a housing (10), a rotation motor (11), an output shaft (12) for carrying and rotating a working implement in a forward operating direction, and a grease lubricated angle drive (13) coupling the output shaft (12) to the motor (11), wherein the angle drive (13) comprises a gear chamber (30) containing lubricating grease, a pinion (16) coupled to the motor (11), and a bevel gear (17) connected to the output shaft (12), and wherein a grease relocating element (33) is movably guided along a substantially circular path (32) in the housing (10), said path (32) being located concentrically with the bevel gear (17), and a coupling device (34) is carried on the bevel gear (17) and arranged to engage and move the grease relocating element (33) along the circular path (32).

2. Power tool according to claim 1, wherein the grease relocating element (33) is arranged to be moved along the circular path (32) at reverse rotation of the output shaft (12).

3. Power tool according to claim 2, wherein the coupling device (34) is arranged to engage and move the grease relocating element (33) at low speed by a low torque viscous engagement at forward rotation of the output shaft (12).

4. Power tool according to claim 3, wherein the circular path (32) is formed by a groove located co-axially with the output shaft (12) on the gear teeth opposite side of the bevel gear (17), and the coupling device (34) is mounted on the gear teeth opposite side of the bevel gear (17).

5. Power tool according to claim 4, wherein the coupling device (34) comprises a leaf spring element (35,36) which is arranged to positively engage the grease relocating element (33) at reverse rotation of the output shaft (12) and to frictionally engage the grease relocating element (33) at forward rotation of the output shaft (12).

6. Power tool according to claim 2, wherein the circular path (32) is formed by a groove located co-axially with the output shaft (12) on the gear teeth opposite side of the bevel gear (17), and the coupling device (34) is mounted on the gear teeth opposite side of the bevel gear (17).

7. Power tool according to claim 6, wherein the coupling device (34) comprises a leaf spring element (35,36) which is arranged to positively engage the grease relocating element (33) at reverse rotation of the output shaft (12) and to frictionally engage the grease relocating element (33) at forward rotation of the output shaft (12).

8. Power tool according to claim 1, wherein the coupling device (34) is arranged to engage and move the grease relocating element (33) at low speed by a low torque viscous engagement at forward rotation of the output shaft (12).

9. Power tool according to claim 8, wherein the circular path (32) is formed by a groove located co-axially with the output shaft (12) on the gear teeth opposite side of the bevel gear (17), and the coupling device (34) is mounted on the gear teeth opposite side of the bevel gear (17).

10. Power tool according to claim 9, wherein the coupling device (34) comprises a leaf spring element (35,36) which is arranged to positively engage the grease relocating element (33) at reverse rotation of the output shaft (12) and to frictionally engage the grease relocating element (33) at forward rotation of the output shaft (12).

11. Power tool according to claim 1, wherein the circular path (32) is formed by a groove located co-axially with the output shaft (12) on the gear teeth opposite side of the bevel gear (17), and the coupling device (34) is mounted on the gear teeth opposite side of the bevel gear (17).

12. Power tool according to claim 11, wherein the coupling device (34) comprises a leaf spring element (35,36) which is arranged to positively engage the grease relocating element (33) at reverse rotation of the output shaft (12) and to frictionally engage the grease relocating element (33) at forward rotation of the output shaft (12).

13. Power tool according to claim 1, wherein the grease relocating element (33) is formed at least to some extent of a magnetic material, and the leaf spring element (35,36) comprises a ferromagnetic material.

* * * * *